Jan. 29, 1963     A. J. STRECKER     3,075,294

AUTOMATIC CENTERING INSTRUMENT

Filed April 28, 1961

INVENTOR.
ALFRED J. STRECKER

BY Roy Griffith Jones

ATTORNEY

United States Patent Office 3,075,294
Patented Jan. 29, 1963

1

3,075,294
AUTOMATIC CENTERING INSTRUMENT
Alfred J. Strecker, Cranford, N.J.
(9 Barker Road, Somerset, N.J.)
Filed Apr. 28, 1961, Ser. No. 106,297
1 Claim. (Cl. 33—189)

This invention relates to an automatic instrument for locating and marking the top dead center of material to be subsequently drilled. One object attained by the invention is the provision of a precision instrument of simple construction.

Another feature of the instrument is that it also functions as a scriber.

The drawings illustrate the invention, and in these:

Figure 1:
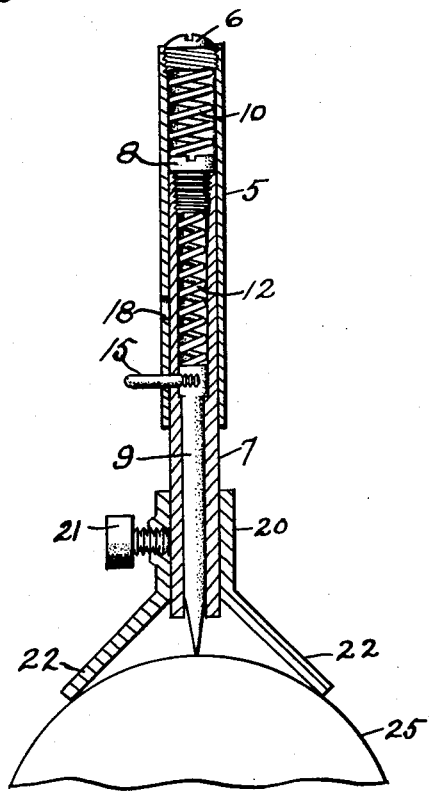
FIGURE 1 shows the instrument, mostly in vertical section, and applied to a cylinder to be marked.
Figure 2:
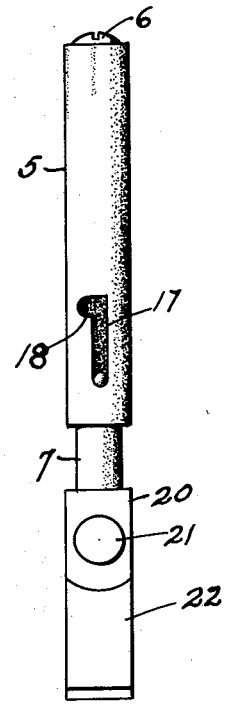
FIG. 2 is an elevational view.
Figure 3:
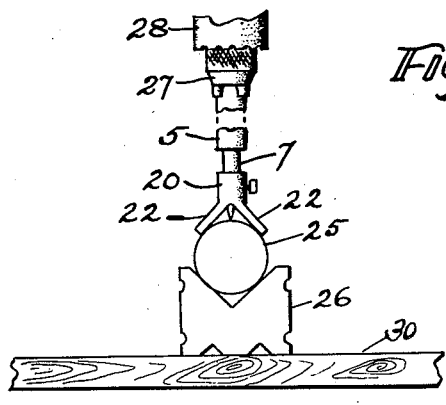
FIG. 3 shows a vertically movable drill press chuck, the instrument therein, and a holding V-block and a cylinder thereon which is to be marked by the instrument.

The instrument comprises a sleeve 5, the upper end of which is closed by a cap 6 which threadedly engages the inner surface of the sleeve. A tube 7 fits slidably in the sleeve and its upper end is closed by a flat headed cap 8 in a manner similar to cap 6. A headed, pointed marker 9 fits slidably into tube 7, and is adapted to extend therebelow to contact and mark the work, the head of the marker resting, in its lowest position, on an internal shoulder within the tube. A coiled spring 10 is placed within the sleeve, between the caps 6 and 8, and a coiled spring 12 is disposed within tube 7, between the upper end of the marker 9 and the cap 8. A projecting pin 15 is screwed into the upper end portion of the marker for the purpose of manipulating the same, and extends at right angles thereto through registering vertical slots 17 formed respectively in the tube and sleeve. The slots are recessed laterally at their upper end to form a ledge 18 on which pin 15 may rest after a small angular turning in its uppermost position. An annulus 20 fits slidably around the lower portion of tube 7 and may be adjustably secured thereto by a set screw 21. A pair of opposed, flat, work-contacting fingers 22 extend outwardly and downwardly, at equal angles, from the annulus, being at right angles to each other, with the pointed end of the marker 9 halfway between. As shown in FIG. 3, a piece of work in the form of a cylinder 25 is placed horizontally on a V-block 26.

2

The instrument is held vertical by clamping the sleeve 5 in the chuck 27 of a drill press 28. The press is then operated to lower the instrument until both of the fingers 22 just touch the cylinder. The marker having been previously raised by means of pin 15, with the latter resting on ledge 18, the pin is pushed off the ledge, whereupon the rapid expansion of the mentioned springs, which are made strong, drive the marker down so that it indents the cylinder at dead top center. To scratch a line on the rod 25, the marker remains down and the V-block and rod are moved along the table 30, the marker thereby acting as a scriber. The upper spring 10 acts as a shock absorber to prevent the marker coming down too hard when the press lowers the instrument onto the work. This spring and the sleeve may be dispensed with if desired. To drill into the work, the instrument is taken out of the chuck and a drill substituted, by which a recess or hole is made in the true direction.

What is claimed is:

An instrument of the character described, comprising a sleeve adapted to be held vertically in a vertically movable chuck, a tube fitting slidably within the sleeve and extending therebelow, a pointed marker slidably fitting within said tube and adapted to extend therebelow, threaded caps closing the upper ends of said sleeve and tube, a first coiled spring within said tube and disposed between the upper end of said marker and the tube cap, a second coiled spring within said sleeve and disposed between said caps, a pin secured to said marker and extending laterally through said tube and sleeve, the two latter members having registering slots through which said pin may move and a pair of opposed, work-contacting fingers extending at equal angles outwardly and downwardly from, and adjustably secured to, said tube, the pointed end of said marker being midway between the work-contacting fingers.

References Cited in the file of this patent

UNITED STATES PATENTS

| | | |
|---|---|---|
| 726,086 | McAlpine | Apr. 12, 1903 |
| 863,909 | Evans | Aug. 20, 1907 |
| 1,063,342 | Ekman | June 3, 1913 |
| 2,220,923 | Trilling | Nov. 12, 1940 |
| 2,847,765 | Bateman | Aug. 19, 1958 |

FOREIGN PATENTS

| | | |
|---|---|---|
| 644,902 | Great Britain | Oct. 18, 1950 |